United States Patent Office 3,495,145
Patented Feb. 10, 1970

3,495,145
POSITION-CONTROL SERVOMECHANISM
Frank J. Sordello and Charles R. Wilford, San Jose, Calif., assignors to International Business Machines Corporation, Armonk, N.Y., a corporation of New York
Filed Oct. 11, 1967, Ser. No. 674,518
Int. Cl. G05b 13/02
U.S. Cl. 318—18                         7 Claims

ABSTRACT OF THE DISCLOSURE

A positioning device includes a linear potentiometer that is responsive to an address transformer, and a feedback loop coupled to the transformer to effect parabolic shaping of a drive signal.

BACKGROUND OF THE INVENTION

Field of the invention

This invention relates to a novel and improved position-control servomechanism, and in particular to a servomechanism that is driven by an error signal that is varied parabolically.

Description of the prior art

In some types of apparatus, it is necessary to drive an element rapidly from one position to a second predetermined position in a minimum of time, without over-shooting the second position. For example, when operating magnetic disk file systems in conjunction with high speed data processing equipment, such as computers, for example, a magnetic head assembly must be moved as quickly as possible from one track to another in either of two radial directions relative to the disk. In some known data disk storage systems, the head assembly is accelerated briefly, then propelled at a linear speed between tracks, and halted abruptly at a selected position. In more recent systems, the head assembly is accelerated to a position approximately midpoint of the distance to be traversed and then decelerated so that the assembly approaches zero velocity at the terminal position.

Position-control servomechanisms are used for controlling the position and velocity of a driven element. A position error signal, which is an indication of the difference between the actual position and the desired, or addressed, position of the element being driven, is used for such control. It has been previously determined that non-linear shaping, specifically parabolic shaping of the position error signal, is desirable to obtain an optimum acceleration and deceleration of the driven element over a predetermined distance. By parabolic shaping of the position error signal, a smooth transition is achieved from acceleration to deceleration at an optimum switchover time. Heretofore, complex and expensive diode switching matrices have been used to approximate the parabolic shaping effect.

SUMMARY OF THE INVENTION

An object of this invention is to provide a position-control servomechanism that affords optimum travel of an element between two predetermined points.

Another object of this invention is to provide a simplified, inexpensive circuit for achieving parabolic shaping of an error signal used in operation of a position-control servomechanism.

Another object is to provide a magnetic disk file wherein a magnetic head carrier is driven from one track to another in a minimum time and in an expedient manner.

Although the invention is disclosed in combination with a magnetic disk file, it should be understood that the novel circuit for parabolic shaping of an error signal as applied to the position-control servomechanism described herein may be used with other types of apparatus.

According to this invention, a position-control servomechanism for a drive system of a magnetic disk file comprises a position transducer, and a variable amplitude oscillator controlled by an error signal obtained from the transducer.

In a particular embodiment, the transducer takes the form of a linear potentiometer having a wiper arm. The potentiometer is driven by a signal from an address transformer. The wiper arm is moved in unison with a carriage to which a magnetic head assembly is fixed. The position and velocity of the carriage are sensed, and the phase and velocity of the drive for the carriage are varied according to error signals that are developed.

In accordance with this invention, the position error signal that is fed back to the variable amplitude oscillator provides parabolic shaping of the position error voltage itself. In this manner, the carriage is driven at maximum acceleration during a first interval of travel, and at substantially maximum deceleration during a second interval of travel, with switchover from acceleration to deceleration occurring at an optimum time.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

Similar numerals refer to similar elements throughout the drawing.

DESCRIPTION OF THE PREFERRED EMBODIMENT

Figure 1:
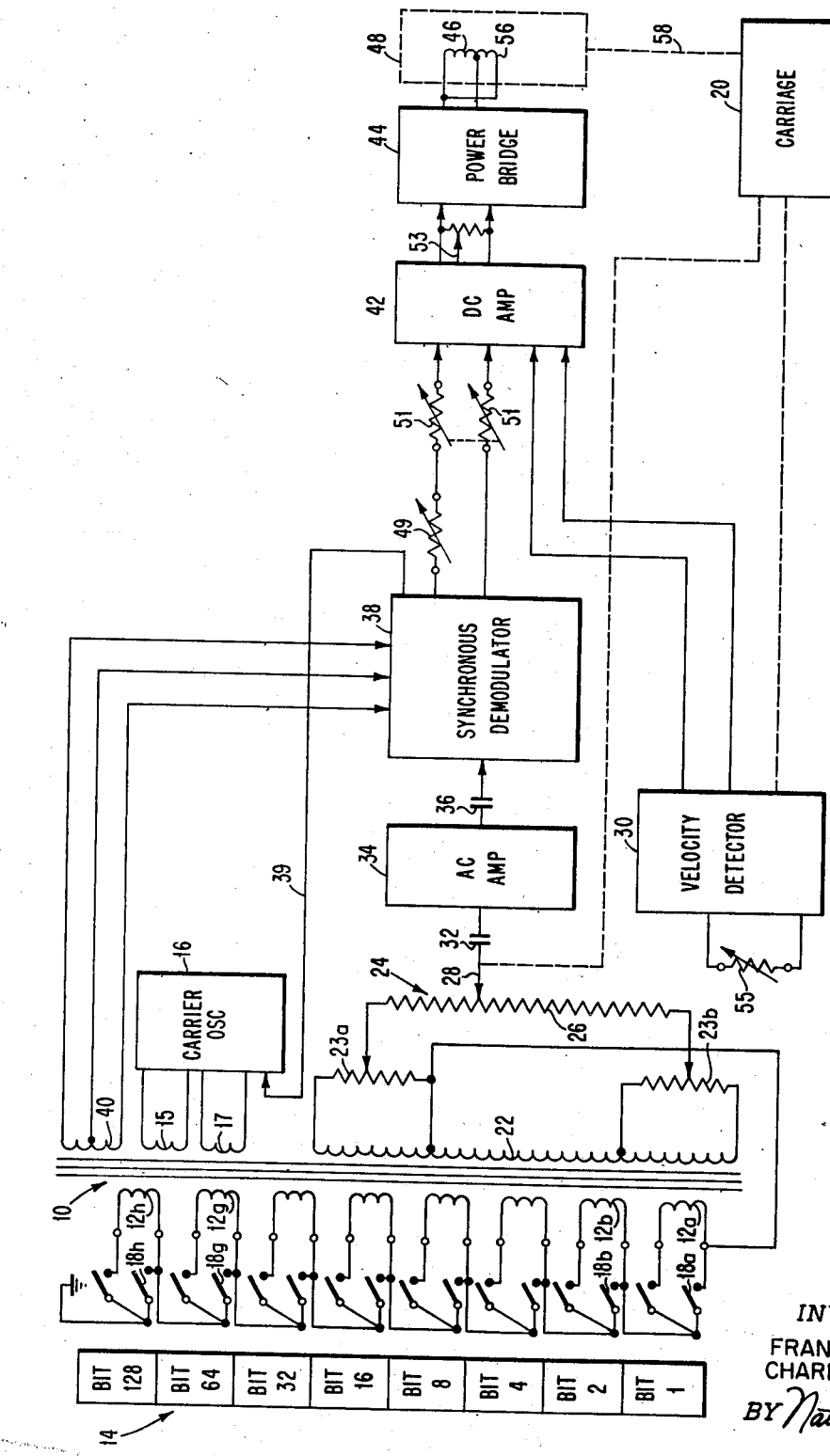
FIGURE 1 is a schematic and block diagram of the position-control servomechanism circuit of this invention.

With reference to FIG. 1, a position-control servomechanism circuit for controlling the drive of an element, in accordance with this invention, comprises an address transformer 10 having a multiplicity of primary coils or windings 12a–h. Each coil 12a–h is formed with a different number of turns or turns ratio, and thus the coils are binary-weighted with values such as 1, 2, 4, 8, 16, 32, 64 and 128, respectively, by way of example. As a result, output voltages proportional to such binary-weighted values may be developed by the primary of the transformer 10.

In operation, an eight-bit register 14 is loaded with a track address when an access drive pulse is received from a central processing unit, for example. This drive pulse gates a new address into the register, and turns on a carrier oscillator 16, which energizes the transformer 10 to initiate the access cycle. The oscillator 16 provides a carrier signal, such 5 kc. (kilocycles per second) by way of example, through a winding 15, and maintains oscillation by virtue of a feedback coil 17, both coils 15 and 17 being coupled to the address transformer 10.

Track addressing is loaded into the address transformer 10 by the eight input binary address lines, represented by the bit blocks 14. Each line 14 serves to activate a reedrelay switch 18a–18h associated therewith, the switches 18 being located on the primary side of the transformer 10. Each switch 18 is connected with a binary-weighted winding 12, so that various combinations of energized switches 16 establish a voltage level that corresponds to the selected track address. The voltage level set into the primary by addressing determines the magnitude of the move that is to be made by the driven element, which in this embodiment is a carriage assembly 20 of a disk file. For example, if the instruction received from the central processing unit is to address a position that requires a move of three discrete steps, then the bit 1 and bit 2 lines of the address register 14 are energized so that corresponding switches 18a and 18b are closed.

The address transformer 10 includes a secondary winding 22 that is connected through end-trim variable resistors 23a and 23b across a position transducer 24 comprising a resistive element 26 and a wiper arm 28, that form a highly linear potentiometer. The wiper arm 28 is mechanically coupled to the carriage assembly 20, together with a velocity detector or tachometer 30. The secondary windings that are connected across the position transducer 24 are in opposition to the primary windings 12, so that the voltage of the secondary bucks against the voltage of the primary, and the output of the transformer 10 equals the difference between the voltages of the primary and secondary. Thus, the transformer 10 performs a summing function in which carriage position, represented by the secondary voltage, is subtracted from the addressed position, represented by the primary voltage to produce a position error signal.

The position error signal modulates the carrier appearing in the secondary, and the modulated carrier is taken from the resistive element 24 by the wiper arm 28, and passed through a capacitor 32 to an AC amplifier 34. The amplified AC signal containing the position error information is fed through a capacitor 36 to a synchronous demodulator 38, which simultaneously receives the reference carrier signal from a tapped secondary coil 40. The demodulated signal is a DC voltage representative of position error. The synchronous demodulator 38 determines the proper polarity of the position error signal, thereby establishing whether the motor drive will be forward or reverse. In accordance with this invention, the demodulated position error signal from the synchronous demodulator 38 is fed back through line 39 to the input circuit of the variable amplitude oscillator 16 so that the oscillator amplitude is inversely proportional to that of the position error signal. The feedback error signal provides the requisite square root shaping of the error signal and controls the switching time from acceleration to deceleration.

It should be noted that the amplitude of the output of the oscillator 16 must be sufficient to enable operation of the demodulator 38. Therefore, the AC amplifier 34 is preferably nonlinear to maintain a proper relation between its amplification and the drive voltage output $E_0$ from the demodulator 38.

The DC voltage output from the demodulator 38 is applied to a DC amplifier 42 concurrently with a velocity error signal obtained by the tachometer 30 that is linked with the load or carriage 20. The position error and velocity error signals are summed in the amplifier 42 to develop a drive voltage of correct polarity, which is applied through a power bridge 44 to the voice coil 46 of an actuator 48.

A heat sink 50 is associated with the bridge 44 to accommodate high power drain, which may be as high as 4.0 amperes at 48 volts for a millisecond, for example. When the circuit is set up prior to operation, gain symmetry and gain control potentiometers 49 and 51, respectively, are initially adjusted for optimum gain and response of the position error signal. Similarly, a potentiometer 53 coupled to the output of DC amplifier 42 is adjusted for amplitude balance, and a variable resistance 55 at the input to the velocity detector 30 is adjusted to set the gain of the detector.

Figure 2:
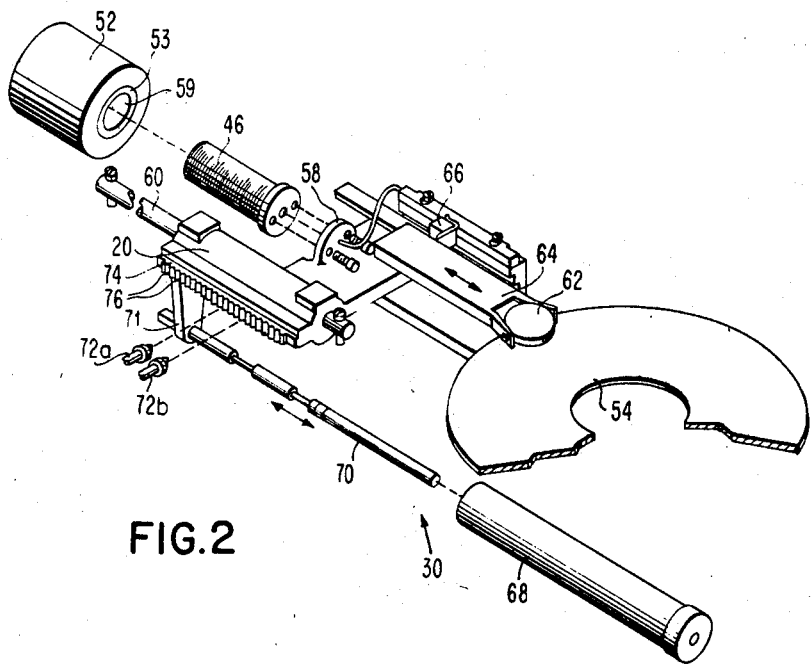
FIGURE 2 is an exploded view, partly broken away, depicting an embodiment of a magnetic disk file incorporating the instant invention.

As depicted in FIG. 2, the voice coil actuator 46 is an electromagnet that is attached to the carriage 20 by bracket means 58, and moves in and out of a bore of a cylindrical drive magnet 52 to drive the carriage. A cylindrical pole piece 59 extends through the permanent magnet drive element 52 to create a cylindrical flux gap. When a voltage is applied to the voice coil 46 for moving the carriage forward or radially inward relative to a magnetic disk 54 of a data file, a current flows through the windings of the coil 46 creating a magnetic field that interacts with the magnetic field in the flux gap. As a result, an electromagnetic force is developed on the coil 46, which causes a thrust forward and ejection from the gap. If the direction of current flow in the coil 46 is reversed, a magnetic field is established that interacts with the flux in the gap, which causes the voice coil 46 to retract into the drive magnet housing. By varying the current that is applied to the voice coil winding, the carriage assembly 24 may be accelerated and then decelerated rapidly to accomplish travel from one track to another of the magnetic disk 54.

When the voice coil 46 is actuated forward, i.e., radially inboard of the magnetic disk 54, an opposing electromagnetic force tends to desaturate the magnetic field generated by the permanent magnet 52. In order to avoid this desaturation effect, a compensating coil 56 (see FIG. 1) is provided inside the permanent magnet 52, and is polarized so that its magnetic field is added to that of the permanent magnet. The compensating coil 56 is energized during a forward move of the voice coil 46, and conversely is not energized during a retract move. This action prevents demagnetization of the drive magnet 52.

In operation, the voice coil 46 is driven forward and in reverse, in accordance with the applied drive signal. The coil 46 is linked to the carriage by means of the bracket 58, and enables the carriage to be moved along a rail 60 in a path that is linearly aligned with a diameter of the magnetic disk 54. A read-write magnetic head assembly 62 is mounted to a carrier arm 64, which extends from the carriage 24 for transducing relation with the disk 54, as is well known in the art. When the carriage 20 is driven by the actuator coil 46, the head assembly 62 is transported radially to a selected track position of the rotary disk 54, the drive motion following the characteristic of the drive signal.

To develop the desired drive signal, the carriage 20 is connected to a transducer wiper-arm block 66, which moves with the carriage. The resistive element 26 of the position transducer 24 is seated on the block 66, and as the carriage 20 travels, the transducer 24 senses the instantaneous position of the carriage and provides the position error voltage to the AC amplifier 34, as described with reference to FIG. 1.

Figure 5:
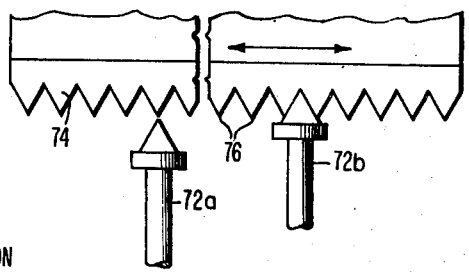
FIGURE 5 is a detailed side view of a rack and detent combination used with the present invention.

A velocity error signal is obtained by means of the tachometer 30 which constitutes a stationary hollow cylinder 68 embodying fixed windings, and a bar magnet 70 formed as an extension rod that is movable within the cylindrical winding structure 68. As the carriage 20 is moved, the magnetic rod 70, which is secured to the carriage by an apertured bracket 71, is also moved to traverse the windings of the fixed cylinder 68, thereby cutting the magnetic flux and inducing an electromotive force (EMF) in the winding or coil 68. The faster that the magnet 70 is moved, the greater the EMF that is developed. The varying voltage obtained from the tachometer 30 represents the velocity error signal that is applied to the DC amplifier 42 in conjunction with the position error signal. To set the carriage assembly 20 at the terminal track position, a detent mechanism is utilized, including a pair of spaced detent pawls 72a, b (see FIG. 5) and a detent rack 74. The rack 74 is attached to the underside of the carriage 20 and is propelled bidirectionally with the carriage. The rack 74 has at least a number of detent positions that correspond to the number of track positions and is engaged by one of the spaced pawls 72a or 72b when the position error signal becomes zero.

In an embodiment of the invention, adjacent tracks of the magnetic disk 58 were spaced at 10 milli-inches, the teeth 76 of the rack 74 were spaced at 20 milli-inches, and the pawls 72a, b were spaced at an odd multiple of 10 milli-inches. Thus, one pawl 72a would be adjacent to the peak of a tooth 76 when the other pawl 72b would be in alignment with the groove, or valley formed between two other teeth 76, and vice versa (see FIG. 5). When the carriage 20 arrives at the terminal position, one of the pawls 72 is selected to be solenoid-actuated to engage the adjacent groove. If the disk track position is identified as an odd number, the binary "1" coil 12a of the address transformer 10 is energized, and the "odd" pawl, say 72a, is actuated. On the other hand, if the selected track is an even number position, then the binary "1" coil 12a is not energized and in such event the "even" pawl 72b would be activated into detent position. In this manner, accurate detenting and positioning are achieved so that the carriage 20 and head assembly 62 are stopped precisely at a selected position.

Figure 3:
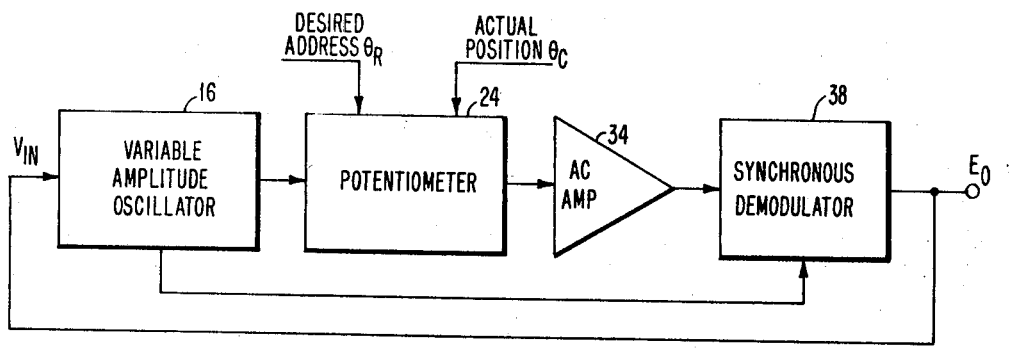
FIGURE 3 is a simplified block diagram of the circuit of FIG. 1, to aid in the explanation of the invention.

FIG. 3 is a simplified block diagram of the inventive circuit from which it can be shown that the drive signal $E_0$ obtained from the synchronous demodulator 38 is parabolic, being a square root function of the position error signal $\theta_R - \theta_C$, where $\theta_R$ is the desired address position that is commanded to the addressing transformer 10, and $\theta_C$ is the actual carriage position as sensed by the potentiometer 20.

It may be determined that (1) $$E_P = K_B(\theta_R - \theta_C)a$$

where $E_P$ is the output voltage from the potentiometer 20, $K_B$ is a constant of the potentiometer, and $a$ is equal to a constant $K_0$ of the variable amplitude oscillator 32 divided by the input voltage $V_{in}$ to the oscillator 32. It is noted that the demodulator output $E_0$ is the same as the oscillator input $V_{in}$, by virtue of the feedback loop.

(2) $$E_X = E_P K_1$$

where $E_X$ is the output voltage of the AC amplifier 36, and $K_1$ is a constant of the amplifier 36.

(3) $$E_0 = E_X K_2 = E_P K_1 K_2$$

where $K_2$ is a constant of the synchronous demodulator 38.

(4) $$E_P = E_0 / K_1 K_2$$

substituting in Equation 1, and for $a = K_0 / E_0$, (5) $$\frac{E_0}{K_1 K_2} = K_B(\theta_R - \theta_C)a = K_B(\theta_R - \theta_C)\frac{K_0}{E_0}$$

By cross-multiplication, (6) $$E_0^2 = (K_B K_0)(K_1 K_2)(\theta_R - \theta_C)$$

(7) $$E_0 = \sqrt{(K_B K_0)(K_1 K_2)(\theta_R - \theta_C)}$$

and (8) $$E_0 = C\sqrt{(\theta_R - \theta_C)}$$

where $C = \sqrt{(K_B K_0)(K_1 K_2)}$ from Equation 8, it is apparent that $E_0$, the output voltage from the synchronous demodulator, used for developing the motor drive signal, is a square root function of the position error signal $\theta_R - \theta_C$.

Figure 4:
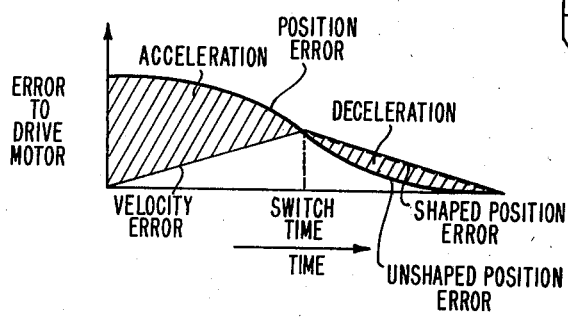
FIGURE 4 is a representation of curves indicating the parabolic shaped signal obtained with the present invention.

FIG. 4 is a plot of position error signal relative to time, illustrating the parabolic shaping achieved with the instant invention. The velocity error signal is also depicted with the acceleration, switchover, and deceleration phases delineated over the drive interval.

To develop the square root of the position error signal, the carrier amplitude is reduced when the selected terminal position $\theta_R$ is further away, and is increased when the selected position $\theta_R$ is closer. It should be understood that either the square of the velocity error signal may be used, or the square root of the position error signal may be used for generating a properly shaped drive signal. However, using a square function of the velocity would require a higher voltage operation, therefore the square root of position error signal is preferred.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for controlling the position and movement of a load from an actual position to a desired position comprising:
   a variable amplitude oscillator for generating a carrier signal; a position transducer for developing a position error signal representative of the difference between said actual and said desired positions, coupled to said oscillator;
   a synchronous demodulator coupled to said position transducer for providing an output voltage related to said position error signal; and
   means for feeding such output voltage to said oscillator, whereby a drive signal having a parabolic characteristic is derived for application to said load.

2. Apparatus as in claim 1, including a velocity detector coupled to said load for sensing the velocity of said load, when driven in response to the drive signal, to develop a velocity error signal.

3. Apparatus as in claim 2, including means coupled to said synchronous demodulator and said velocity detector for summing the position error signal and velocity error signal to develop the drive signal.

4. Apparatus as in claim 1, including a voice coil adapted to be actuated by said drive signal, and said load comprising a carriage assembly that is mechanically coupled to said voice coil.

5. Apparatus as in claim 1, including a detent assembly comprising a rack and a pair of detent pawls, said rack having a multiplicity of teeth uniformly spaced at a distance $d$ and said pawls being spaced at an odd multiple of one-half such distance $d$.

6. Apparatus as in claim 1, including an addressing transformer having primary and secondary windings for providing a signal indicative of the desired position to said transducer.

7. Apparatus as in claim 6, wherein said position transducer comprises a linear potentiometer having a variable resistive element coupled to a secondary winding of said transformer.

References Cited
UNITED STATES PATENTS 3,241,015  3/1966  Allen _____ 318—29 XR
3,293,522  12/1966  Lewis _____ 318—327
3,343,991  9/1967  Koenig _____ 318—18 XR BENJAMIN DOBECK, Primary Examiner U.S. Cl. X.R.

318—28